Figure 1:
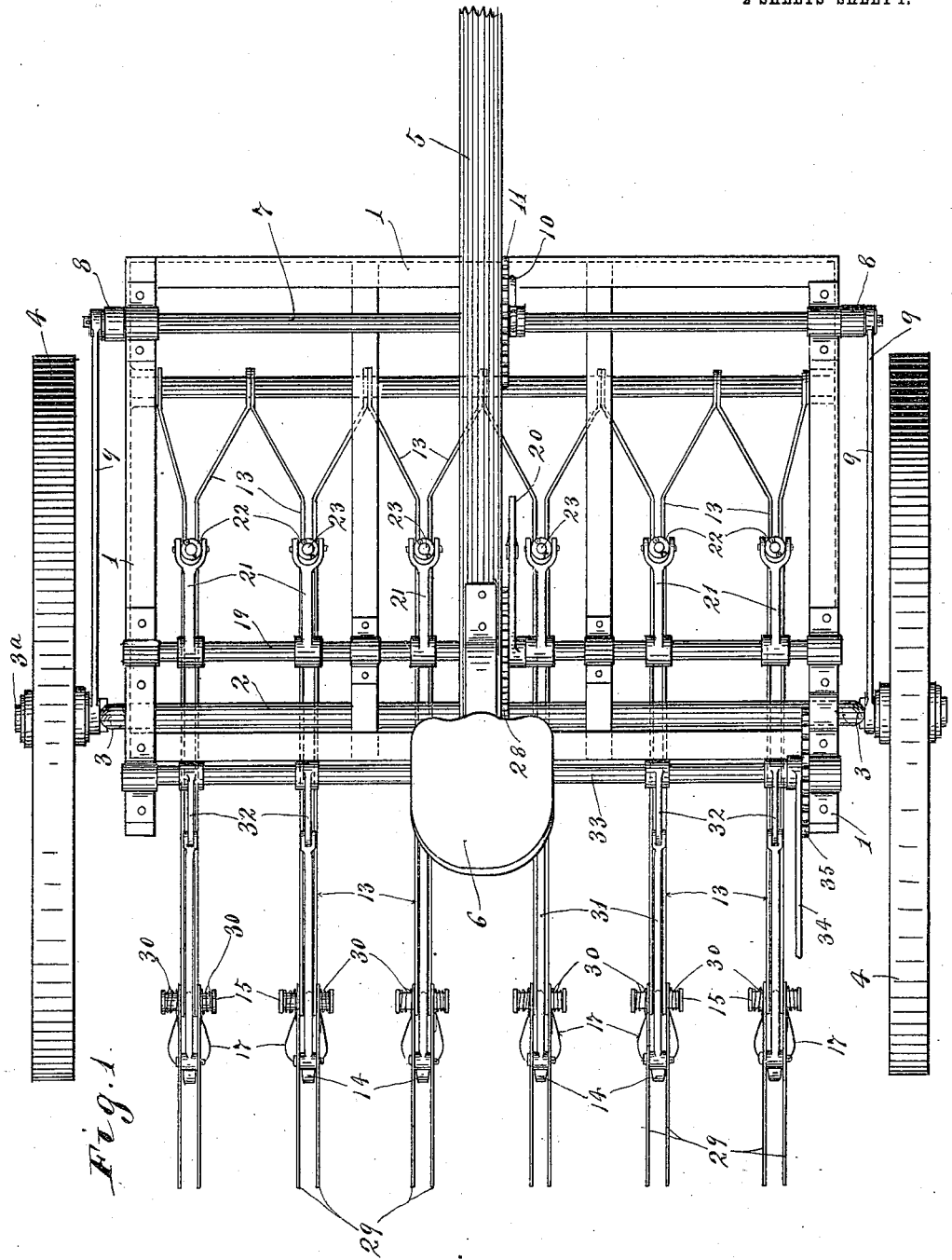

C. W. STARK.
COMBINED GRASS GRUBBER AND CULTIVATOR.
APPLICATION FILED MAR. 23, 1910.

975,173.

Patented Nov. 8, 1910.
2 SHEETS—SHEET 1.

Witnesses.
A. H. Opsahl.
W. H. Souba.

Inventor.
Charles W. Stark.
By his Attorneys
Williamson Merchant

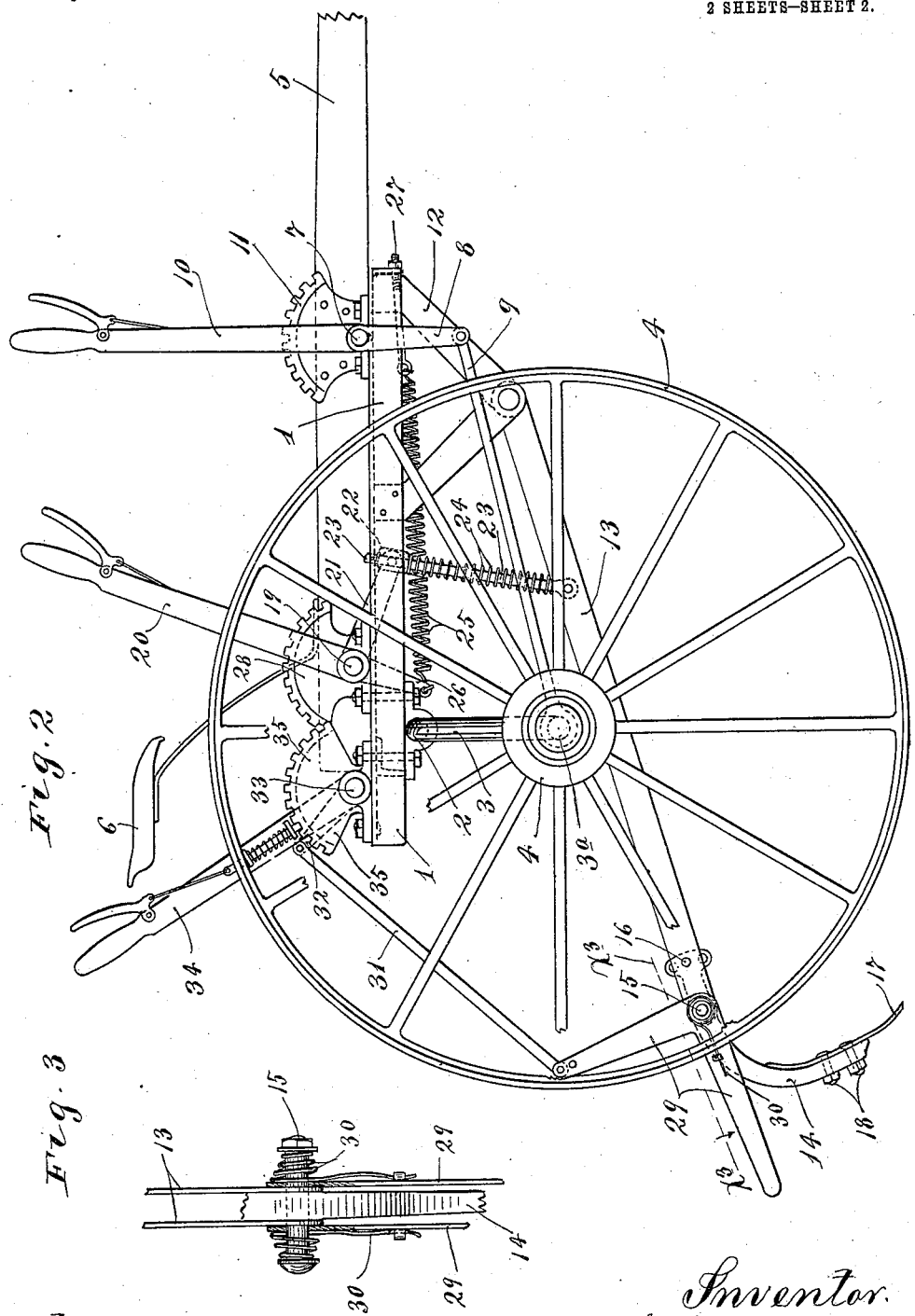

UNITED STATES PATENT OFFICE.

CHARLES W. STARK, OF MOUNTAIN LAKE, MINNESOTA.

COMBINED GRASS-GRUBBER AND CULTIVATOR.

975,173.  Specification of Letters Patent.  Patented Nov. 8, 1910.

Application filed March 23, 1910. Serial No. 551,173.

*To all whom it may concern:*

Be it known that I, CHARLES W. STARK, a citizen of the United States, residing at Mountain Lake, in the county of Cottonwood and State of Minnesota, have invented certain new and useful Improvements in Combined Grass-Grubbers and Cultivators; and I do hereby declare the following to be a full, clear, and exact description of the invention, such as will enable others skilled in the art to which it appertains to make and use the same.

My invention has for its object to provide a simple and efficient agricultural machine adapted for use as a combined grass grubber and cultivator, and to this end, the invention consists of the novel devices and combinations of devices hereinafter described and defined in the claims.

The present machine is on the same general lines as the machine disclosed and broadly claimed in my prior Patent No. 892,910, of date July 7th, 1908, entitled "Grass grubber", and the present improvement embodies certain features which better adapt the machine for commercial purposes, consideration being given both to the cost of the manufacture of the machine and to the action and durability of the machine in service.

In the accompanying drawings which illustrate the improved machine embodying the several features of the invention, like characters indicate like parts throughout the several views.

Referring to the drawings, Figure 1 is a plan view showing the improved machine; Fig. 2 is a side elevation of the same, some parts being broken away; and Fig. 3 is a detail view, on an enlarged scale, partly in section, on the line $x^3$ $x^3$ of Fig. 2.

The framework 1 of the machine is preferably rectangular, being, as shown, made up of a multiplicity of laterally spaced angle bars connected by front and rear angle iron tie bars. This framework may, however, take various forms so far as my invention is concerned. As a rear portion, the framework is provided with axle bars 2, in which are journaled the transverse portion of a crank axle 3, on the trunnions $3^a$ of which large truck wheels 4 are journaled.

A pole 5 is rigidly secured to the central portion of the frame 1 and, as shown, a seat 6 is applied to the rear end of this pole. Extending transversely across the front portion of the framework 1 and journaled in suitable bearings thereon, is a crank shaft 7 provided, at its ends, with depending crank arms 8 that are connected by links 9 to the trunnions $3^a$ of the crank axle 3. A latch lever 10 is rigidly secured to the central portion of the crank shaft 7 and coöperates with a lock segment 11, shown as fixed to the pole 5, to hold the crank axle 3 in any desired position, either in vertical or oblique planes, all for a purpose which will be hereinafter more fully stated. At this point, it is only necessary to note that, when the latch of the lever 10 interlocks with the segment 11, the crank axle will be locked or held in a rigid position in respect to the frame 1.

Secured to, and depending from, the longitudinally extended bars of the frame 1, are so-called hanger brackets 12, to which the front ends of drag beams 13 are pivotally attached. These drag beams 13 are, as shown, made up of a pair of laterally spaced flat metal bars, to the rear ends of which curved drag teeth or fingers 14 are attached, preferably, by pivot bolts 15 and coöperating shearing pins 16, which latter are passed through coincident perforations in the forwardly projecting upper ends of said teeth and in the bars of said drag beams.

In some instances the lower end of the teeth 14 themselves will be used in direct contact with the ground, but in most instances, I prefer to employ detachable and endwise reversible cultivating blades or supplemental toothed facings 17, shown as detachably secured thereto by short nutted bolts 18.

For simultaneously raising and simultaneously lowering the drag beams 13, I provide a rock shaft 19 mounted in suitable bearings of the frame 1 and provided with an upwardly extended latch lever 20 and with a multiplicity of forwardly extended crank arms 21, of which latter there is one for each drag beam 13. As shown, the front ends of the crank arms 21 are bifurcated and provided with pivotally attached heads 22, through which the upper ends of coupling bolts 23 are passed. The lower ends of said coupling bolts 23 are pivotally connected to the intermediate portions of the corresponding underlying drag bars 13, and coiled springs 24 surround said rods and are compressed between said drag beams and heads 22. The rods 23, therefore, serve as links through which to lift the drag bars and the cultivating teeth carried on the free ends thereof.

To counterpoise in part the weight of the drag bars and the parts mounted on the free ends thereof, a heavy coiled spring 25 is attached, at one end, to a short depending arm 26 of the rock shaft 19 and, at its other end, is adjustably connected by a nut-equipped eye bolt 27 to the front of the frame 1. This spring 25 makes the work of raising the drag bars and the parts carried thereby an easy matter by manipulations of the lever 20.

The latch lever 20 coöperates with a lock segment 28 fixed on the frame 1; and, when the said lever is locked in a forward position, the cultivating devices will be held engaged with the ground, while, when the said lever is locked in a rear position, said cultivating devices will be held above the ground. When the cultivating devices, to-wit, 17, are lowered into operative positions, they will be yieldingly held to their work by the springs 24, but may raise slightly to pass over an obstruction. If one of the said blades should strike an obstruction, over which it cannot pass and through which it cannot be drawn without danger of breaking the machine, such excessive strain will shear off the coöperating pin 16.

In this improved machine, I employ so-called tooth-cleaning devices, which are broadly of the construction disclosed and claimed in my prior patent above identified, but more nearly resemble the cleaning devices disclosed and claimed in my prior Patent No. 930,996, of date August 10th, 1909, entitled "Combined grass grubber and cultivator." The present invention, however, includes improved means for setting and operating these cleaning devices. Each of the said cleaning devices, as preferably constructed, comprises a pair of laterally spaced bell cranks 29, which, at their elbows, are loosely pivoted on the projecting portions of the pivot bolts 15, before noted. These pivot bolts 15 have headed outer ends, between which and the bell cranks 29, coiled springs 30 are compressed. These coiled springs yieldingly press the rearwardly and downwardly projecting arms of the bell cranks toward each other, so that they will maintain engagement with the coöperating teeth 14 and the blades 17, and may separate, as required, to pass over the transversely widened portions of said blades.

The upper ends of each pair of bell cranks are connected to the lower ends of links 31, and the upper ends of all these links 31 are pivotally connected to arms 32 of a rock shaft 33 that is mounted in suitable bearings on the rear portion of the frame 1. This rock shaft 33 is provided with a latch lever 34, that coöperates with a lock segment 35 rigidly secured to the frame 1, preferably at the right hand side of the rear portion thereof. This latch lever 34 affords means for operating the cleaning devices at will, and it also, when locked to the segment 35, affords means for automatically operating said cleaning devices whenever the drag bars 13 are raised so as to move the blades 17 above the ground.

By manipulations of the lever 10, the wheels may be thrown forward or rearward, at will, of the relative position shown in Fig. 2, so as to thereby materially change the weight on the end of the pole, and, with the same adjustments, the framework of the machine and the parts carried thereby may be set in different vertical adjustments. This adjustment of the said crank axle and the wheels requires different setting of the lever 34 in order to produce any predetermined or definite cleaning movement of the cleaning devices 29, under upward movement of the drag bars 13. Some times also, the conditions of the soil or other conditions make desirable greater movements of the cleaning devices than at others. All of these variations in the automatic action of the cleaning devices are provided for by the connections above described, and, furthermore, as already indicated, by manipulations of the lever 34, when the drag bars are raised, the cleaning devices may be given a number of movements, if required, over the cultivating teeth and blades. Frequently, such repeated actions are required to remove clay, mud or tangled weeds or grass from the said teeth and blades.

This improved machine meets all the requirements encountered in actual work. The machine is capable of quite a number of analogous uses, but is especially designed for use as a combined grass grubber and cultivator where it is desired to remove from the ground quack grass and various other destructive grasses or weeds, and, at the same time, cultivate the ground. By the use of the proper blades or cultivating teeth, it is, however, perfectly adapted for use as an ordinary cultivator, and it may be used in wet or muddy ground or ground containing clay as well as in more sandy soils.

What I claim is:

1. In a machine of the kind described, the combination with a frame and a wheel supporting the same, of drag bars attached to said frame, means for raising and lowering said drag bars, cultivating teeth on the rear ends of said drag bars, cleaning devices coöperating with said teeth, and means for operating said cleaning devices at will and independently of movements of said drag bars.

2. In a machine of the kind described, the combination with a frame and a wheel supporting the same, of drag bars attached to said frame, cultivating teeth on the rear ends of said drag bars, teeth-cleaning devices coöperating with said teeth, connections for automatically moving said cleaning devices over said teeth under vertical movements of said drag bars, and means for moving said cleaning devices over said teeth at will and independently of movements of said drag bars.

3. In a machine of the kind described, the combination with a frame and a wheel supporting the same, of drag bars attached to said frame at their front ends, means for raising and lowering said drag bars, cultivating teeth on the rear ends of said drag bars, cleaning devices in the form of laterally spaced bell cranks pivotally connected to and coöperating with said cultivating teeth, a lock segment on said frame, a latch lever coöperating therewith, and connections between said latch lever and the upwardly extended arms of said cleaning devices.

4. In a machine of the kind described, the combination with a frame and a wheel supporting the same, of drag bars connected to said frame at their front ends and provided with cultivating teeth at their rear ends, cleaning devices in the form of levers or laterally spaced arms pivotally connected to and coöperating with said cultivating teeth, a latch lever and a coöperating relatively fixed lock segment on said frame, connections between said lever and said drag bars for simultaneously raising and simultaneously lowering the same, yieldingly pressed laterally spaced pairs of bell cranks pivotally connected to and coöperating with said cultivating teeth, a second latch lever and a relatively fixed coöperating lock segment applied to said frame, and connections between said lever and the upper arms of said cleaning devices, substantially as described.

In testimony whereof I affix my signature in presence of two witnesses.

CHARLES W. STARK.

Witnesses:
  ABR. JANZEN,
  P. C. KLAASSEN.